United States Patent [19]
Angruner

[11] 3,890,910
[45] June 24, 1975

[54] METHOD OF LAYING WEBS OF COMPOSITE MATERIAL CONTAINING PLANT SEED

[75] Inventor: Herbert Angruner, Vienna, Austria

[73] Assignee: Bunzl and Biach Aktiengesellschaft, Vienna, Austria

[22] Filed: Apr. 19, 1973

[21] Appl. No.: 352,422

[30] Foreign Application Priority Data
Apr. 19, 1972 Austria .............................. 3423/72

[52] U.S. Cl. ........................................ 111/1; 47/56
[51] Int. Cl. .............................................. A01c 1/00
[58] Field of Search ...................... 47/58, 56; 111/1

[56] References Cited
UNITED STATES PATENTS

| | | |
|---|---|---|
| 2,192,939 | 3/1940 | Slayter et al. ....................... 47/56 X |
| 2,605,589 | 8/1952 | Kuestner ................................. 47/56 |
| 2,826,865 | 3/1958 | Chohamin ............................... 47/56 |
| 2,909,003 | 10/1959 | Marshall ................................. 47/56 |
| 2,923,093 | 2/1960 | Allen ....................................... 47/56 |
| 3,154,884 | 11/1964 | Segre Amar et al. ............... 47/56 X |
| 3,160,986 | 12/1964 | Watson et al. ......................... 47/56 |

*Primary Examiner*—Stephen C. Pellegrino
*Attorney, Agent, or Firm*—Hubbell, Cohen and Stiefel

[57] ABSTRACT

Method of making and laying webs of composite material, including plant seeds, such as grass seeds. Method includes steps of preparing base by producing a gravel foundation overlaying a layer of sand, fertilizing the prepared surface, applying a vegetation layer, such as peat moss, then fertilizing and compacting and roughening the surface prior to laying down the composite web, the web being laid in strips that are sewn together and that are clamped to the ground by metal clamps which are removable by a pull cord.

11 Claims, 6 Drawing Figures

PATENTED JUN 24 1975

3,890,910

METHOD OF LAYING WEBS OF COMPOSITE MATERIAL CONTAINING PLANT SEED

The present invention relates to a method of laying webs of composite material containing plant seeds:

THE PRIOR ART

In U.S. Pat. Application Ser. No. 210,524, now abandoned, composite materials containing plant seeds and a method of manufacturing same are described. Although with the webs of composite material described there excellent results with respect to the growth of plants, and particularly growth of grass, as well as with respect to the mechanical strength of the webs have been obtained, various problems have nevertheless occurred, particularly when it is desired to cover large areas with the webs, to hold said webs firmly on the ground and connect them together until the nonwoven fiber web is firmly connected with the ground by germination and growth of the grass. In addition to this, it has been found that the mechanical strength of the nonwoven fibers which is in itself excellent can be further increased by corresponding treatment of the ground. The holding in place of the nonwoven fiber web with as little possibility of movement as possible until the plants have grown through it is necessary, since relative movements of the nonwoven web with respect to the surface of the ground during the period of germination would lead to the destruction of the only partially germinated plants. Squalls of winds can also lead to the raising of and falling of the seedlings out of the web of nonwoven fibers.

Furthermore, the web of nonwoven fibers has the advantage that as a result of its construction, it stores sufficient water for the growth of the plants, so that in this way less watering with longer intervals between becomes necessary. In combination with a completely automatic underground watering system, these advantages of the nonwoven fiber web bring about a reduction in the cost of care of 50% as compared with normal turfs. In hot and dry regions, greater resistance to dryness results.

On the other hand, due to the mat-type construction, excess water after cloudbursts and long rains is rapidly removed and the athletic field can be immediately used again.

The nonwoven fiber web in combination with the ground permits a precise regulating of the growth of the turf as required, since the nonwoven fiber web stores the fertilizer fed it. For instance, by prior fertilization, the turf can be made to regenerate itself particularly rapidly and ruggedly for special periods of games.

It has now been found necessary to effect the laying and fastening until growth in order to prevent subsequent tearing or pulling out by means of shoe cleats or the like. It has furthermore proven necessary to develop the underlying ground in such a manner that in combination with the web of nonwoven fibers, it not only permits the positive properties thereof to act, but even substantially increases them.

In this connection it is known to sew nonwoven fiber webs, material and the like together to form different structures and shapes. It is furthermore known that mats, plates etc., can be fastened on wood, concrete or the like by means of steel staplers operated with compressed air.

Finally, it is known to construct modern grassy sports areas on undersoil of good drainage and on a sand layer in well compressed form with an uppermost vegetation layer of sand and humus or sand and peat moss mixture, and to introduce the seeds into the latter, along also with the insertion of a reinforcing fabric in a depth of 8 to 15 cm. By this construction a better removal of the water after heavy rain is obtained, while a better rooting is assured by the fact that the sand remains loose.

Nevertheless the wearing properties — as has been found by tests — are improved by not more than about 20%, referred to the duration of use. The danger of a player slipping on the wet ground still exists since in this case also particles of earth are pulled as lubricant over the leaves, thus creating greater slipperiness. In this way the danger of injuries is increased and the quality of the play reduced.

SUMMARY OF THE INVENTION

The object of the present invention is thus a method of laying webs of composite material containing plant seeds which is characterized by the following method steps:

a. Production of a water-permeable rubble base, b. Application and compacting of a layer of sand, c. Application of a complete fertilizer with depot action, d. Application of a vegetation layer and compacting thereof, e. Application of a complete fertilizer which is immediately absorbable, f. Slight roughening of the surface, g. Laying of the webs of composite material, h. Fastening of the edges of the webs to each other, preferably by sewing, i. Fastening of the webs to the ground by removable wire staples, j. Strewing a thin layer of sand in an amount of about 0.2 to 1, and preferably 0.5 to 0.8 kg/m$^2$, and k. Possibly spraying a dispersion of binder on the completely laid web surface, in which connection method steps a) to f) are preferably employed.

It is only the laying and fastening of a seeded nonwoven fiber web in accordance with the invention, and in particular in accordance with U.S. Patent Application Ser. No. 210,524, now abandoned, on a corresponding base or a corresponding ground which produces a lawn surface having the following unusually advantageous wearing properties.

In accordance with the invention, a homogeneous, uniform, flat lawn surface consisting practically of a single piece is produced, which surface can be used or played on at any time, even in periods of great heat, in dry regions, after thunderstorms or lengthy rains, during and after the melting of snow, during frost and snow, etc. There is no danger of slipping since no particles of earth can be thrown onto the blades of grass, so that there is a reduced danger of the users injuring themselves, and better athletic performance are thus obtained.

Furthermore, due to the compressed substructure and the elastic web of nonwoven fibers, the ball-playing properties of the field are improved as compared with a normal grass field.

The athletic-field construction consisting of the sand construction described in combination with the layers of composite material has been shown by tests and examinations to have properties which promote the conditioning of athletes and protect their joints, as a result of the extremely favorable elastic behavior under foot. This is due in particular to the fact that a relatively hard substrate and a relatively thin elastic web of nonwoven fiber are present. In contrast with to this, for instance, soft, deep play areas lead rapidly to fatigue and hard play areas lead to inflammation of joints or injury thereto.

The laying of the seeded web of nonwoven fiber in accordance with the invention makes it possible to obtain a lawn which can be played on within four months thereby dramatically reducing the customary waiting time of 1½ years. The germination and growth or formation of the turf are improved. The useful life is increased about 6 times.

DETAILED DESCRIPTION OF THE PREFERRED EMBODIMENT

The following description of a detailed example is merely exemplary of one embodiment of the present invention and should not be read so as to limit the scope of the invention described hereinafter.

EXAMPLE

1. On a well draining rubble substrate there is applied a 10 to 12 cm thick sand layer consisting of river sand, particle size, of not greater than 0 mm. In dry and hot regions it may be desirable to mix the river sand with an equal amount of pumice stone or crushed lava, of particle size between about 0.5 to 30 mm, mixed (or with other strongly water-storing substances such as, for instance, Hygromull or the like). The substrate is intensively rolled and alternately sprayed with water so that, for instance, of a 200-pound man with normal gait and wearing a size 12 shoe does not leave impressions of a depth of more than 1 to 2 mm. Thereupon a complete fertilizer with a high nitrogen content and depot action, such as, for instance, Wolf No. 1230 - 20:5:8, is spread on in an amount of 60 g/m².

2. Thereupon a vegetation layer of a thickness of about 5 to 8 cm is applied with a gradient of about 0.3 to 0.5% in the direction of the longitudinal axis and solidified in the manner described under item 1. The composition of the mixture is as follows: about 75 volume percent river sand of particle size up to about 4 mm, which contains no lime and has not more than 10% elutriatable particles, the sand being uniformly mixed with about 25 to 40 vol% peat moss (the peat moss having been previously slightly moistened and mixed with 15 kg Agrosil per every 1.5 m³ of loosened peat litter).

Over the top vegetation layer there is again strewed complete fertilizer of high nitrogen content but without depot action, such as, for instance Wolf 1231 23:7:7, in an amount of 40 g/m².

3. Thereupon the entire area is roughened very slightly with a rake, to a depth of about 0.5 to 1 mm. Thereupon the mat is laid thereon.

4. The webs of nonwoven fabric can be laid in the longitudinal or transverse direction of a field. First of all, a wedge-shaped ditch of a width of about 10 cm and a depth of about 10 cm is cut out in the longitudinal direction of the nonwoven web at the outermost edge of the area to be covered. Thereupon the first web is rolled out and the outer edge placed in said depression. The mat is then fastened in said groove to the rolled sand bottom by the use of galvanized steel wire clamps introduced by compressed air at a distance apart of about 10 cm (the clamps are 65 mm long and 12 mm wide). Later on the ditch is filled with the material of the vegetation layer.

Figure 1:
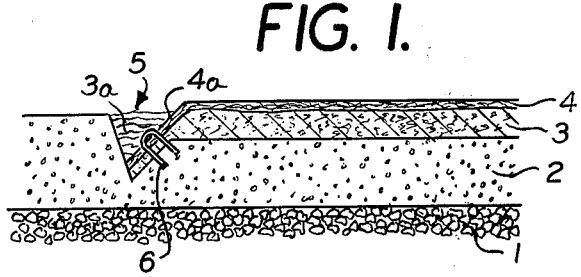
FIG. 1 is a cross section through a substrate developed in accordance with the invention, with nonwoven fiber web placed thereon.

A field prepared in this manner is shown in cross section in FIG. 1. In this figure, 1 is a gravel foundation over which a layer of sand is rolled. Over the layer of sand 2 there is placed the vegetation layer 3 and over the latter the nonwoven web 4 containing the plant seeds. Between the layers 2 and 3, as well as between the layers 3 and 4, thin layers of fertilizer are spread. The edge of the playing field is designated by 5. Here there is a ditch into which the end 4a of the nonwoven layer 4 is inserted. This end 4a of the nonwoven web is fastened by clamps 6 to the layer of sand 2. The ditch present at 5 is in its turn filled with the material 3a of the nonwoven layer 3.

5. Over the first web which now lies on the foundation, with its top facing upward and fastened at the outer edge, there is now rolled out the second web with its edges coinciding with the first and with its surface facing downward, so that the surfaces of the two webs rest against each other. The edges of the first and second webs are now sewn together (overcast stitch, since in this way an edge-to-edge seam is produced).

Figure 2:
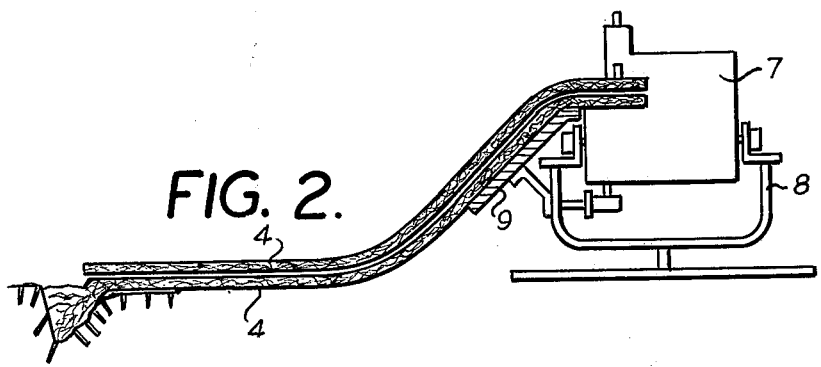
FIG. 2 shows schematically how two webs are connected along the edge with each other in accordance with the invention by a traveling sewing head.
Figure 3:
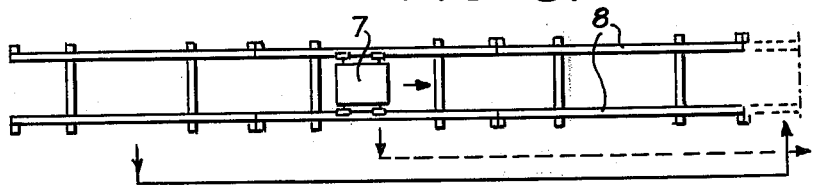
FIG. 3 is a top view of a sewing head which is movable on rails.

The sewing itself is carried out, for instance, as follows: A sewing machine head 7 (FIGS. 2, 3) slides on double rails, transporting itself by means of a rack and pinion drive. On the one side of the double rail there is a ledge 9 with fixing needles. The rails are developed as transportable and couplable units. The two webs 4 which lie surface-to-surface against each other are needled onto the ledge 9. The machine slides past the fixed edge and simultaneously sews or cuts. The rail system consists of three elements of a length of about 5 to 6 m. While the sewing machine, for instance, is already working on the second rail, the first rail is disconnected and placed behind the third, etc., etc., until the other end of the web or of the field is reached.

Such a machine can also be mounted on a carriage of a size of 80 × 80 mounted on four very wide, non-steerable lawn tires. This machine then has a specially developed, reinforced sprocket wheel for transporting the two webs of nonwoven fiber through the sewing machine (i.e. gripper). One man steers and guides the machine along the two combined webs of nonwoven fiber. Two men take up the webs and introduce them into the machine or permit them to pass through same. Also in this case the sewing together takes place with an overcast stitch and simultaneous cutting of the edges.

After reaching the end of the field or the end of the web, the second web is swung out to the right so that then both webs lie alongside of each other connected by a seam. Thereupon the first web is tensioned somewhat by pulling on the second web, and fastening with the steel wire clamps is effected on the first web along the seam.

Since in accordance with the rules of the International Football Association Federation (FIFA), in view of the danger of injury, no metal parts may be present on the finished field the following system has been employed.

The steel wire clamps are driven into the sand somewhat obliquely, through the mat over a plastic cord with the use of an air gun. The clamps are then seated on this plastic cord. As a result of this, the fastening pressure is distributed better, and after the growth, all the clamps can be abruptly pulled out by means of the cord.

After the fastening of the first web, one starts to repeat the process all over, i.e. the third web is sewn in the manner described to the second web, swung open, and the second web then fastened, etc., up to the other end of the field. There the outer end of the last web is again inserted in a wedge-shaped ditch. The same procedure is used on the two other sides of the field after the trenching of the edges of the web.

Figure 4:
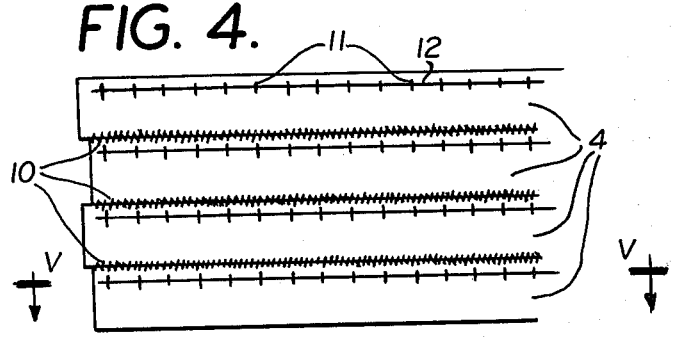
FIG. 4 shows nonwoven webs attached to each other and fastened to the substrate.
Figure 6:
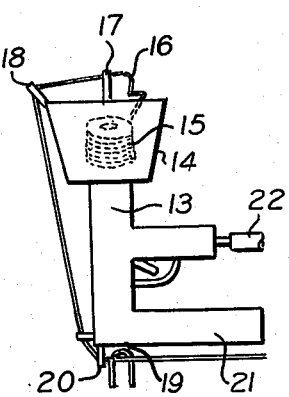
FIG. 6 shows schematically a staple gun such as can be used in accordance with the invention.
Figure 5:
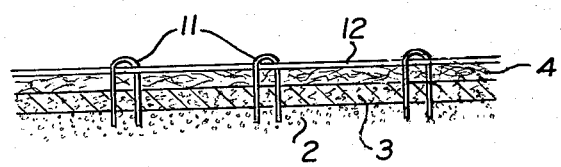
FIG. 5 is a cross section along the line V—V of FIG. 4.

A structure of fiber webs formed in this manner is shown schematically in FIGS. 4 and 5. It should be noted that the fiber webs 4 are connected with each other at the abutting places by seams 10. At the edge of each web it should be noted that clamps 11 extend over a cord 12 into the ground 3 and 2 respectively. It is clear that by pulling the cord perpendicularly of the surface of the web, the clamps can easily be pulled out of the ground one after the other.

In order to handle the cord with the gun 13 and the clamps in one operation, a sheet metal housing 14 which receives the coil of cord 15 is provided on the gun 13. From there the cord 16 slides through a disk-shaped thread brake 17 and eyelets 18 up to the outlet opening 19 for the clamps. There there is provided a notched guide 20 so that upon each closing of a clamp, the cord comes to lie precisely between the two arms of the clamp.

At 21 there is shown the clamp magazine from which in each case one clamp is ejected by compressed air which is fed at 22.

When the entire area has been covered in this way, the mat is pressed down by a 500 kg roller so that all seams and other unevennesses which might have arisen also in the foundation by footsteps during the laying are evened out. Thereupon sand of a particle size of 0 to 0.3 mm is strewed with uniform distribution in an amount of about 0.5 to 0.8 kg/m². After the first rain, this provides an additional moisture storage and a weighting of the web of unwoven fiber, since the fine granules of sand penetrate between the fibers.

In dry and windy regions, a latex dispersion (aqueous) in a quantity of 40 g/m² is then sprayed over the completely laid web of nonwoven fiber.

This dispersion remains adhering to the uppermost hairs and reduces the space between the fibers, as a result of which evaporation is reduced without impeding germination and growth.

While I have herein shown and described the preferred form of the present invention, other changes and modifications may be made therein within the scope of the appended claims without departing from the spirit and scope of the present invention.

I claim:

1. Method of laying composite webs containing plant seeds over a field surface comprising:

treating said field surface by producing a water-permeable gravel foundation, applying and solidifying a layer of sand, applying a complete fertibilizer having depot action, applying a vegetation layer and compacting it, applying a complete fertilizer which is immediately absorbable, and slightly roughening the surface;

then laying the composite webs over the surface of the field;

sewing the edges of the webs to each other;

fastening the webs to the ground by removable wire clamps; and spreading a thin layer of sand in an amount of about 0.3 to 1 kg/m².

2. Method according to claim 1, characterized by the fact that the vegetation layer is made in a thickness of 4 to 10 cm, from a mixture of sand and peat moss.

3. Method according to claim 1, characterized by the fact that nitrogen-rich complete fertilizers are used.

4. Method according to claim 1, characterized by the fact that the edge of the surface of composite webs is sunk into the ground and fastened there, and the resultant groove is filled with the material of the vegetation layer.

5. Method of claim 1, further comprising the step of spraying a binder onto said web surface.

6. Method of claim 1, wherein said webs are laid in abutting strips and the sewing is effected by a searing machine that is transportable along said abutting edges.

7. Method of claim 1, wherein, prior to said webs being fastened to the ground, a pull cord is laid over said webs and then the wire clamps are driven to connect said pull cord and web to the ground so that upon subsequently pulling said pull cord, said fastener may be removed.

8. Method of claim 1, wherein, prior to said webs being fastened to the ground, a pull cord is laid over said webs and then the wire clamps are driven to connect said pull cord and web to the ground so that upon subsequently pulling said pull cord, said fastener may be removed.

9. Method according to claim 1, characterized by the fact that the layer of sand is about 7 to 15 cm thick and is formed from sand having a particle size of not greater than 10 mm.

10. Method of claim 9, wherein said sand is mixed with a water saturable material.

11. Method of claim 10, wherein said water saturable material is pumice stone, crushed lava or peat moss.

* * * * *

UNITED STATES PATENT OFFICE
CERTIFICATE OF CORRECTION

Patent No. 3,890,910  Dated June 24, 1975

Inventor(s) Herbert Angruner, et al

It is certified that error appears in the above-identified patent and that said Letters Patent are hereby corrected as shown below:

Column 6, line 15, "fertibil-" should read -- fertil- --.

Signed and Sealed this twenty-seventh Day of January 1976

[SEAL]

Attest:

RUTH C. MASON
Attesting Officer

C. MARSHALL DANN
Commissioner of Patents and Trademarks